US008078289B2

(12) United States Patent
Stephenson et al.

(10) Patent No.: US 8,078,289 B2
(45) Date of Patent: Dec. 13, 2011

(54) MODEL PREDICTIVE CONTROL WITH VARIABLE TRAJECTORY SHARING

(75) Inventors: Brian Kent Stephenson, Georgetown, TX (US); Lina M. Rueda-Velandia, Austin, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 632 days.

(21) Appl. No.: 12/165,404

(22) Filed: Jun. 30, 2008

(65) Prior Publication Data

US 2009/0326678 A1    Dec. 31, 2009

(51) Int. Cl.
*G05B 19/18* (2006.01)
*G05B 11/01* (2006.01)
*G05B 13/02* (2006.01)

(52) U.S. Cl. ......... 700/2; 700/3; 700/9; 700/19; 700/20; 700/50

(58) Field of Classification Search .................. 700/3, 9, 700/19, 20, 50, 2
See application file for complete search history.

(56) References Cited

U.S. PATENT DOCUMENTS

| | | | | | |
|---|---|---|---|---|---|
| 4,275,439 | A | * | 6/1981 | Kuwata | 700/32 |
| 5,301,101 | A | * | 4/1994 | MacArthur et al. | 700/36 |
| 5,394,322 | A | * | 2/1995 | Hansen | 700/37 |
| 5,414,799 | A | * | 5/1995 | Seraji | 700/260 |
| 5,561,599 | A | * | 10/1996 | Lu | 700/44 |
| 7,653,445 | B2 | * | 1/2010 | Chia et al. | 700/28 |
| 2004/0230325 | A1 | * | 11/2004 | Ramamoorthy et al. | 700/37 |
| 2007/0059838 | A1 | * | 3/2007 | Morrison et al. | 436/55 |
| 2007/0142975 | A1 | * | 6/2007 | Piche | 700/286 |
| 2007/0156288 | A1 | * | 7/2007 | Wroblewski et al. | 700/266 |
| 2008/0103748 | A1 | * | 5/2008 | Axelrud et al. | 703/12 |
| 2008/0109100 | A1 | * | 5/2008 | Macharia et al. | 700/110 |
| 2009/0061544 | A1 | * | 3/2009 | Holland et al. | 438/14 |

OTHER PUBLICATIONS

Ferrarini-L., "Hierarchical Multi-Layer CAD System for Systematic Design of Complex Logic Controllers" 1996, Pergamon, pp. 173-184.*
Schreyer et al., "Hierarchical State Decomposition for the Design of PLC Software by Appying Axiomatic Design", 2000, Proceedings of ICAD 2000, p. 1-8.*
Gonzalez et al., "A Simulation-Based Controller for Distributed Discrete-Event Systems with Application to Flexible Manufacturing", 1997, Winter Simulation Conference, p. 1-8.*

* cited by examiner

*Primary Examiner* — Albert Decady
*Assistant Examiner* — Thomas Stevens
(74) *Attorney, Agent, or Firm* — Fletcher Yoder, P.C.; William R. Walbrun; John M. Miller

(57) ABSTRACT

One or more techniques are provided for the sharing of variable trajectories between multiple controllers in a control system. In general, the present technique is based upon the sharing of predicted desired variable trajectories between multiple controllers requiring a common input variable. In one embodiment, a common input variable is shared between two controllers, wherein one controller is tuned to have dominant control with regard to the shared variable. Each controller determines and communicates their own desired trajectory for the shared variable to the other controller and in doing so, the constraints associated with each controller are shared and honored by the other controller. Based on the communicated trajectories, the dominant controller may exercise control over the shared variable, thus improving overall process control.

26 Claims, 9 Drawing Sheets

MODEL PREDICTIVE CONTROL WITH VARIABLE TRAJECTORY SHARING

BACKGROUND

Embodiments of the present invention relate generally to control systems, and more particularly to model predictive control employing novel techniques for the sharing of variable trajectories between two or more controllers.

Various control system designs currently exist for a variety of industrial applications. In general, feedback control systems provide for the sensing one or more detectable parameters of a process, and drive a controlled variable to a desired level on the bases of one or more parameters, which may be sensed or provided by an operator (e.g., user-specified set point), for instance. The basis for such control system designs may include parametric models, neural network models, linear and non-linear models, to name only a few.

In model predictive control (MPC) systems, one or more MPC controllers may utilize a dynamic multivariable predictive model representing relationships among multiple process variables, including both manipulated variables and control variables. As will be appreciated by those skilled in the art, control variables (CV's) are those variables that a controller tries to bring to some objective (e.g., to a target value, maximum, etc.). Manipulated variables (MV's) may be referred to as those which the process has control authority over, and which are moved or manipulated by a controller in order to achieve the targets or goals indicated by the CV's. Control of the MV's may, however, be limited by operating constraints imposed against a particular controller, as discussed below.

MPC controllers may utilize dynamic multivariable predictive models for defining an input/output relationship for a process that not only reflects how much an output changes in response to an input change, but may also reflect the rate (e.g., time-dependent function) at which an output will change based on one or more input variable changes. The dynamic predictive models may also be based upon knowledge of any operating constraints, including both controllable (e.g., those that the process has discretion to change) and external constraints (e.g., those relating to safety, environmental, physical, legal or other system limitations) with regard to particular process variables.

An MPC controller may derive or predict "target profiles" or anticipated trajectories representing desired future values or set points for particular process variables over a period of time. The trajectories may be predicted or derived based on prior and present knowledge of certain process variables as well as the input/output relationships and/or constraints associated with such variables, as discussed above. Accordingly, process control may be implemented to achieve one or more control objectives based on these predicted variable trajectories. For instance, based on a desired trajectory, an MPC controller may implement control actions in order to "move" or adjust a process variable towards a particular set point or target defined by the predicted trajectory.

A particular problem with existing control systems arises when multiple controllers in a control system are designed such that their control outputs are based on one or more common process variables. Because the constraints imposed on each controller and other process variables received by each controller may vary, the variable trajectories predicted by each of the multiple controllers for the common process variable may differ. Thus, effective control of the common variable based on the differing trajectories may be difficult. Accordingly, there exists a need for a technique to resolve differing trajectory forecasts among multiple controllers relying on common variables to implement control actions in a process control system.

BRIEF DESCRIPTION

Embodiments of the present invention provide a technique for the sharing of variable trajectories between multiple controllers in a control system. The technique may be used in any suitable control system, including those used in industrial applications, commercial applications, vehicles, manufacturing applications, and so forth.

In general, the present technique is based upon the sharing of predicted desired variable trajectories between multiple controllers requiring a common input variable. By way of example, in an embodiment in which a common MV is shared between two controllers, one controller is assigned dominant control with regard to the shared MV. Each controller determines and communicates its own desired MV trajectory for the shared MV to the other controller. Thereafter, each controller reads the other controller's MV trajectory as the desired trajectory and, in doing so, the constraints associated with each controller are shared and honored by the other controller. For instance, from the viewpoint of the dominant controller, the desired trajectory of the subordinate controller is viewed as an "MV request," whereas from the viewpoint of the subordinate controller, the desired trajectory of the dominant controller is viewed as the limit of the MV value may be offered based on the constraints associated with the dominant controller.

The dominant controller with regard to the shared MV may be designated based on the assigning of one or more tuning "coefficients" associated with the shared MV in each controller. For instance, the dominant controller may be tuned with less emphasis on the MV desired value received from the subordinate controller, whereas the subordinate controller may be tuned with more emphasis on the MV desired received from the dominant controller. In one embodiment, the tuning coefficients may represent a degree of effect on a controller's objective or cost function with regard the shared MV. That is, lower emphasis on the shared MV in the dominant controller may represent a higher degree of freedom for adjusting the shared MV, whereas a higher emphasis on the shared MV in the subordinate controller may indicate a high degree of restriction.

Dominance of one controller in the foregoing scenario is further ensured by allowing only the dominant controller to write the shared MV set point to a distributed control system (DCS), for example. The dominant controller may determine whether or not it is able achieve its control objectives based on the desired MV set point requested by the subordinate controller (e.g., by adjusting other MV's). For example, if the dominant controller determines that it is able to achieve its control objectives using the desired MV trajectory of the subordinate controller by adjusting other MV's in view of any other pertinent constraints, then the dominant controller may allow for the subordinate controller's desired MV trajectory to be realized, for example, by writing a set point value corresponding to the subordinate controller's desired value for the shared MV to a corresponding DCS. However, if the dominant controller determines that it is unable to provide the subordinate controller's desired MV based on existing constraints relating to its control objectives, then the subordinate controller's "MV request" is denied, and the subordinate controller is forced to implement its control functions based on the dominant controller's shared MV trajectory.

This technique may be particularly useful in process systems having multiple sub-processes which may have different batch processing times. For instance, a shared manipulated variable being used in a continuous or a batch sub-process having a relatively long processing time may have more flexibility to temporarily deviate from a desired trajectory over an associated control horizon, with the understanding that such temporary deviations may be compensated for later in process. Similarly a concurrent batch process having a relatively short processing time may impose more stringent constraints on the shared manipulated variable (e.g., may be tuned to be dominant).

The application of the techniques described herein may thus provide for an orderly resolution of conflicts when multiple controllers relying on a common shared variable seek differing trajectories for the shared variable in carrying out their respective process control functions. As such, the techniques described herein, when utilized in processes, may advantageously contribute to increased throughput capacity and/or improved consistency in product or feeds, for instance.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
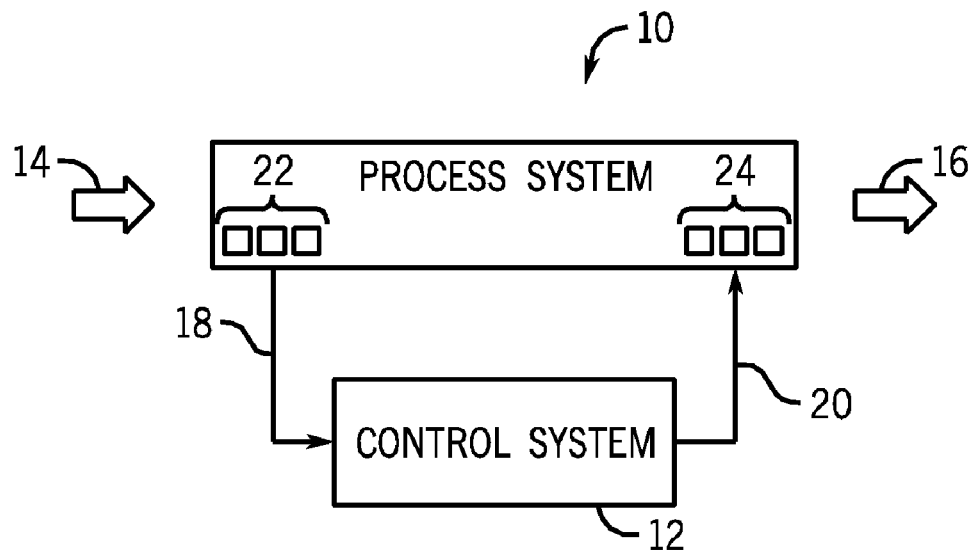
FIG. 1 is a diagrammatical representation of a process system equipped with a control system designed to implement the present technique.

Turning now to the drawings, and referring first to FIG. 1, a process system 10 is illustrated that is at least partially regulated by a control system 12. As will be appreciated by those skilled in the art, the process system 10 may be any conceivable type of process, such as a manufacturing process, a steady state or batch process, a chemical process, a material handling process, an engine or other energy utilizing process, an energy production process, and so forth. In general, the process system 10 will receive one or more inputs 14, and produce one or more outputs 16. In complex processes found in the industry, many such inputs may be utilized, including feed stocks, electrical energy, fuels, parts, assemblies and sub-assemblies, and so forth. Outputs may include finished products, semi-finished products, assemblies, manufacturing products, by products, and so forth. Based upon the system dynamics, the physics of the system and similar factors, the control system 12, may regulate operations of the process system 10 in order to control both the production of the outputs as well as quality of the outputs, and so forth.

In the embodiment illustrated in FIG. 1, the control system 12 performs control functions 20 in response to process information 18 received from the process system 10. For instance, process information 18 may be provided by one or more sensors 22 configured to detect and/or measure certain parameters of the process system 10, which may include measurements representative of both manipulated and control variables. In general, such sensors 22 may include measurement devices, transducers, and the like that may produce discrete or analog signals and values representative of various variables of the process system. Such sensors 22 commonly produce voltage or current outputs that are representative of the sensed variables. The process information 18 may also include controllable and external operating constraints, as well as user-specified set points, for example.

The sensors 22 may be coupled to one or more controllers of the control system 12. In practice, many such sensors and more than one controller may be provided in the control system 12. For instance, referring now to FIG. 2, the control system 12 is illustrated as including multiple controllers, designated by the reference numerals 26, 28, and 30. Each controller 26, 28, and 30 may include an application-specific or general purpose computer programmed to carryout the functions described herein. The controllers 26, 28, and 30 may each receive process information (PI) 18, represented herein by the reference labels $PI_1$, $PI_2$, and $PI_n$, respectively. Based on the process information received, each controller 26, 28, and 30, may generate appropriate control outputs (CO), indicated herein by the reference labels $CO_1$, $CO_2$, and $CO_n$, respectively. As will be described below, where multiple controllers are provided, such as illustrated herein, each controller may be adapted to cooperatively function to control the process system 10. In one embodiment, the controllers 26, 28, and 30 may utilize model predictive control (MPC) techniques.

Figure 2:
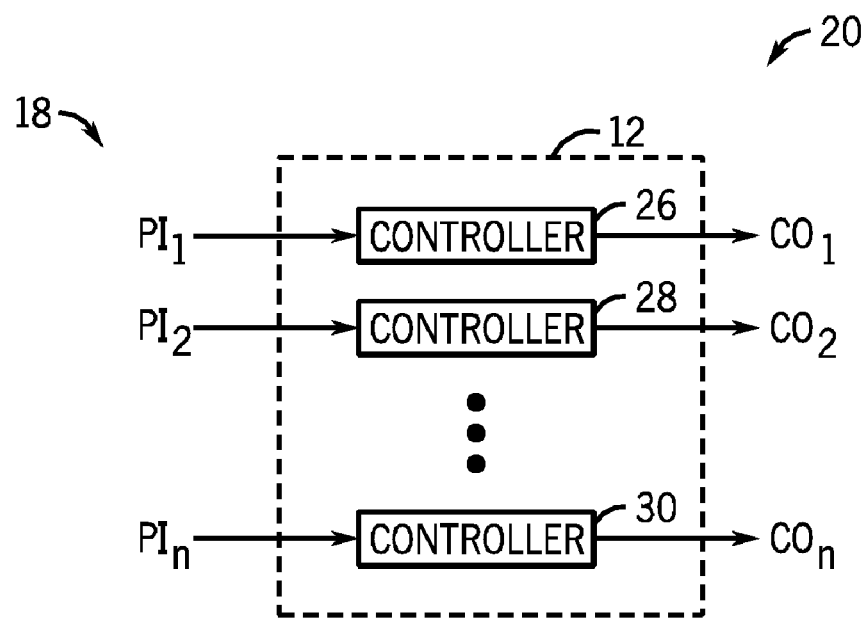
FIG. 2 is a diagrammatical representation illustrating a plurality of controllers which may be included with the control system depicted in FIG. 1.

Referring back to FIG. 1, the control outputs $CO_1$, $CO_2$, and $CO_n$ illustrated in FIG. 2 may be representative of control actions or functions 20 to one or more actuators 24 that serve to alter portions of the process system 10 to regulate the process output 16. Such actuators 24 may include, by way of example only, valves, motors, position devices, pumps, and so forth. The sensors 22 may be generally considered to provide signals representative of measured values of process variables (MV's or CV's). These measured values again, may be analog or digital signals or values, and may be measured directly by the sensors, or in certain applications may be derived from certain measured values. As one skilled in the art will appreciate, based upon certain measured values, the controller (e.g., 26, 28, 30) or other signal processing circuitry may develop or derive values for certain system parameters based upon a predictive control model, which may define mathematical relationships between the measured values and those desired parameters. Such inference may be particularly useful where control is desired based upon particular system parameters that are impossible or difficult to detect. The present technique for model predictive control may thus employ virtual on-line sensors (VOA's) that affectively operate as a sensor by differentially determining certain desired variables for control purposes.

The controller may then determine the appropriate control action or actions (e.g., manipulation of MV's to desired set points) required to achieve or approach a control objective, which may be defined by one or more objective or cost functions associated with the controller. In some embodiments, the objective or cost functions may be defined as part of a dynamic predictive model, as will be discussed in further detail below. Further, in practice, the desired set points of certain process variables determined by a controller may or may not be communicated to the actuators 24 themselves. That is, the actuators 24 may receive drive signals having the effect of moving certain process parameters towards their desired set points, such as a valve position signal for driving a valve actuator in order to cause a desired flow rate, the flow rate itself being the desired set point for an MV or CV.

Figure 3:
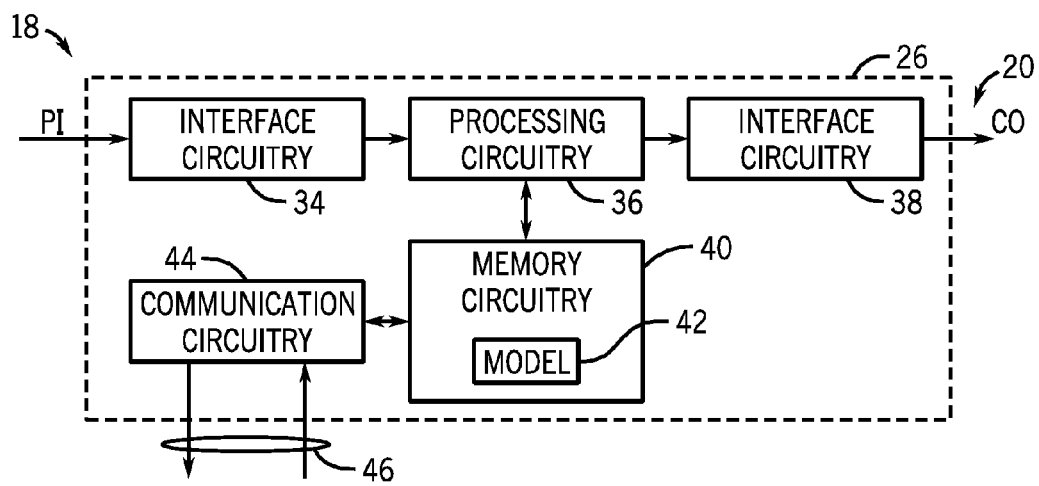
FIG. 3 is a diagrammatical representation of certain functional components which may be included in the controllers of FIG. 2.

FIG. 3 illustrates certain exemplary components that may be included in an MPC controller of the type illustrated in FIG. 2. Many other components may be included, depending upon the system design, the type of system controlled, the system control needs, and so forth. In the embodiment illustrated in FIG. 3, interface circuitry 34 receives process information which, as discussed above, may include values or signals obtained using the sensors 22. The interface circuitry 34 may include filtering circuitry, analog-to-digital conversion circuitry, and so forth. The interface circuitry 34 is in data communication with processing circuitry 36 which may include any suitable processor, such as a microprocessor, a field programmable gate array, and so forth. The processing circuitry 36 carries out control functions, and in the present embodiment may perform model predictive control functions based upon knowledge of the process system 10. For instance, the processing circuitry 36 may execute one or more model predictive control algorithms to develop values for the controlled variable, including forward-looking trajectories for MV's and CV's. Such algorithms, as illustrated herein, may be defined by a control model 42 stored in a memory circuit 40 communicatively coupled to the processing circuitry 36. The memory circuit 40 may also include control routines executed by the processing circuitry 36, as well as certain desired variables, variable settings, set points, and so forth.

Figure 4:
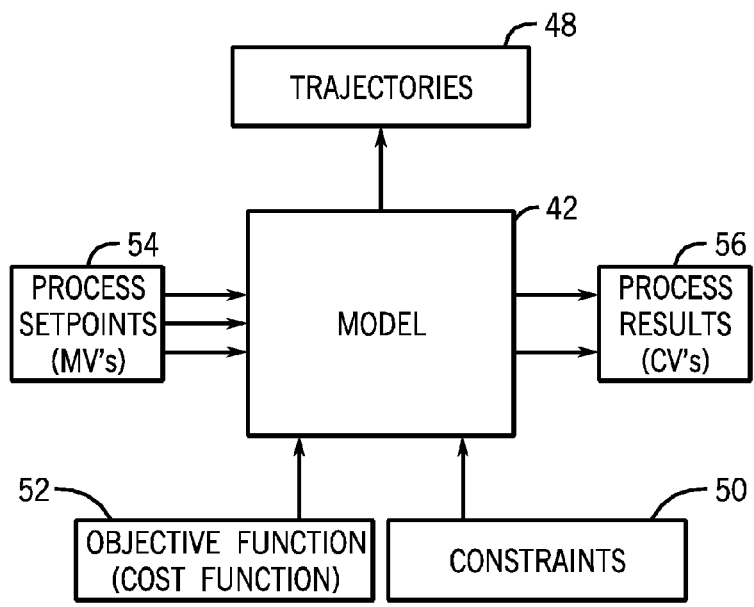
FIG. 4 is a diagrammatical representation of a dynamic multivariable predictive model that may be implemented by a controller of FIG. 2.

Referring briefly to FIG. 4, an exemplary dynamic multi-variable predictive model 42 which may govern the control actions implemented by the MPC controller 26 is illustrated. As one skilled in the art will appreciate, a dynamic predictive model may define mathematical relationships that include not only steady state relationships, but also time varying relationships required for each parameter change to be realized in an output. In other words, a model 42 may not only define how changes in certain process variables affect other process variables, but also rates at which such changes occur. Based on such relationships, the model 42 may derive or predict one or more anticipated trajectories representing desired future values or set points for particular process variables over a period of time, illustrated herein by reference numeral 48. The trajectories 48 may be determined based at least partially on certain operating constraints 50 imposed on the controller as well as one or more objective functions 52 associated with the controller.

As discussed above, constraints 50 may include controllable constraints (e.g., those that a process has the ability and discretion to change) as well as external constraints (e.g., those outside of the process itself). Essentially, the constraints 50 imposed on a particular controller may be representative of limits by which a controller may manipulate certain MV's in controlling a process. An objective function 52 may be a mathematical relationship which defines or sets the goal or goals for the overall optimization of the process 10 (or sub-processes within a process). In general, an objective function 52 may provide one or more consistent numerical metrics by which a process or sub-process strives to achieve and over which the performance of the process or sub-process may be measured or evaluated. As will be appreciated, an objective function 52 may be defined in terms of either objectives to be obtained or maximized or costs to be minimized, or both. Thus, the model 42 may attempt to achieve one or more process results or targets (CV's) 56 based on the control or manipulation of set points for one or more other process variables (MV's) 54 in accordance with the aforesaid trajectories 48, constraints 50, and objective function 52 associated with the controller.

Returning now to FIG. 3, the processing circuitry 36, based upon the control algorithm defined in the model 42, may output signals to interface circuitry 38 that may be used to drive the actuators 24 of the process system 10. The interface circuitry 38 may include various driver circuits, amplification circuits, digital-to-analog conversion circuitry, and so forth. That is, using the process information 18 received (which may include measured or inferred values of the MV's), the controller 26 may determine appropriate control actions or outputs based on the variable relationships, constraints, and/or objectives defined by the predictive model 42. Further, in situations where multiple controllers operate in a cooperative fashion, such as illustrated in FIG. 2, communications interface circuitry 44 will be generally provided to each controller. By way of example, the communications interface circuitry 44 may include networking circuitry configured to network the controller 26 with other controllers (e.g., 28, 30) in the control system 12, as well as with remote monitoring and control systems, for instance.

Figure 5:
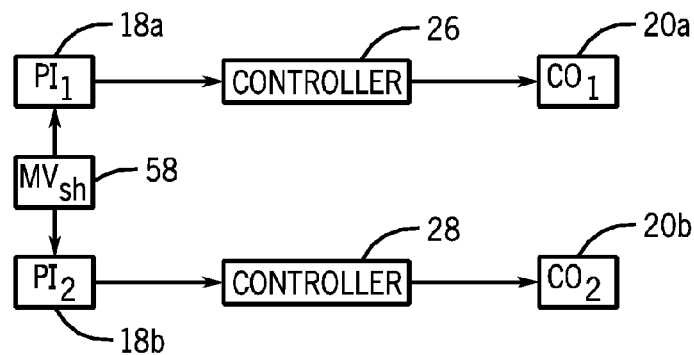
FIG. 5 is a diagrammatical representation illustrating two controllers each basing their respective control outputs at least partially on a shared process variable in accordance with an embodiment of the present invention.

As discussed above, multiple controllers within a control system may be configured to base their respective control outputs at least partially on a common shared variable. This situation is illustrated in FIG. 5. As depicted in FIG. 5, the process information 18a and 18b received by controllers 26 and 28, respectively, may include a common shared MV, designated herein by reference numeral 58. Thus, the control outputs 20a and 20b of controllers 26 and 28, respectively, are both based at least partially on the shared MV 58. As discussed above, in conventional control systems, the foregoing situation presents a problem when the operating constraints imposed on each of the controllers 26 and 28 results in different desired projected trajectories (i.e., looking forward in time) for the shared MV 58. For instance, the situation may arise in which a first controller 26 would adjust controllable outputs based upon the shared MV 58 taking on certain anticipated values in accordance with its projected trajectory, while a second controller 28 would adjust controllable outputs based upon the shared MV 58 following a different projected trajectory. Thus, as discussed above, effective control of the shared MV 58 may be difficult in view of differing desired trajectories determined by each controller.

Embodiments of the present invention offer one or more solutions to address the foregoing problem. In particular, the present technique is based upon the sharing of predicted desired variable trajectories between multiple controllers relying upon common input variables. As discussed above, a controller, based on received process information, which may include measured values for MV's and CV's, operator inputs, constraints, and so forth, may be configured to execute one or more model predictive control algorithms to develop forward-looking trajectories for MV's and CV's. These trajectories generally reflect future desired values for a particular process variable, and may be determined based at least partially on the current process information, as well as the operating constraints imposed on the controller. In a situation where two controllers implement control based upon the same MV, the forward-looking trajectories developed by each controller for the shared MV may be communicated to the other controller. Thus, the constraints associated with each controller, which may be reflected in the MV trajectories, are shared and recognized by the other controller. Further, in order to effectively "prioritize" control of the shared MV between the two controllers, one controller is assigned dominant control with regard to the shared MV.

Figure 6A:
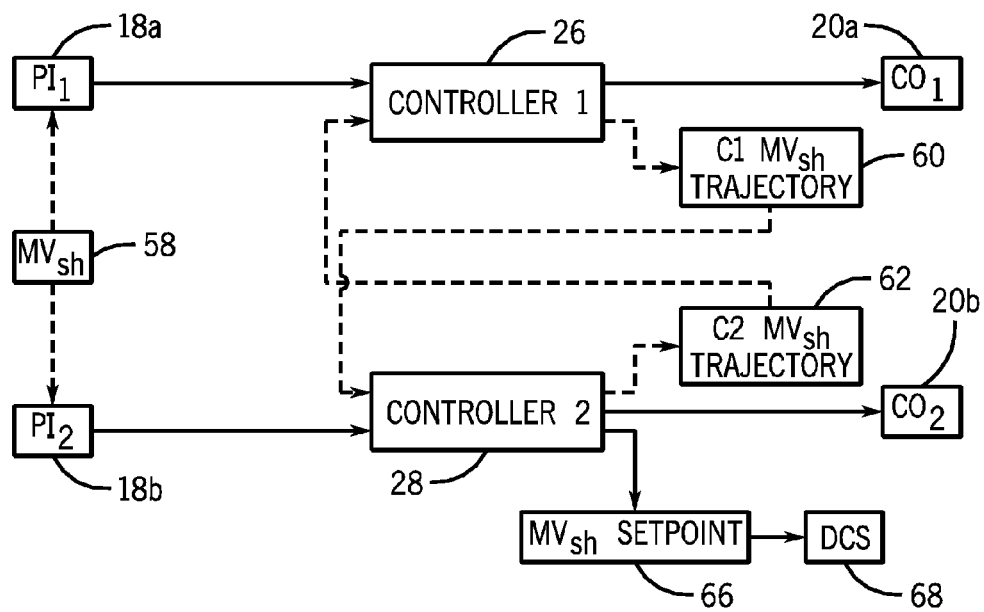
FIG. 6A is a diagrammatical representation illustrating the sharing of respective desired trajectories for a process variable shared by two controllers in accordance with an aspect of the present technique.

The above-described situation may be better understood with reference to FIG. 6A, which illustrates two controllers 26 and 28 sharing a common MV, designated by reference numeral 58. The controller 26 determines control outputs 20a based on received process information 18a. Similarly, the controller 28 bases control outputs 20b on received process information 18b. As discussed above, the process information 18a and 18b received by controllers 26 and 28, respectively, may include measured values of various MV's and CV's associated with each controller. In the presently illustrated configuration, each of the controllers 26 and 28 may base their respective control outputs 20a and 20b on the common shared MV 58. That is, the process information 18a received via the controller 26 and the process information 18b received via the controller 28 may both include data indicating a measured or inferred value for the shared MV 58.

In addition to generating control outputs 20a and 20b, each of controllers 26 and 28 may also generate forward-looking desired trajectories for its MV's and CV's based at least partially on the received process information 18a and 18b and/or the constraints imposed on each controller. In particular, as illustrated in FIG. 6A, the controller 26 determines its desired trajectory 60 for the shared MV 58, which is communicated to controller 28. Similarly, the controller 28 determines its desired trajectory 62 for the shared MV 58, and communicates the trajectory 62 to the controller 26. As such, the constraints associated with each controller 26 and 28 are shared and recognized by the other controller.

By way of example only, the shared MV 58 may be representative of a particular temperature variable in the overall process being controlled by the controllers 26 and 28. For instance, referring now to FIG. 6B, graphical representations of trajectories 60 and 62 are illustrated, wherein each of the trajectories 60 and 62 may represent a desired temperature curve over a control horizon represented by the "time" axis. The repeating nature of the trajectory curve 62, as illustrated by the periodic behavior 64, may be indicative that the controller 28 is adapted to control a batch process within the overall process, while the trajectory curve 60 may imply that the controller 26 controls a continuous process or at least a batch process having a substantially longer processing time. Further, as illustrated in by the trajectory curves 60 and 62, each of the controllers 26 and 28 may anticipate different values for the shared MV 58 at time $t_1$. For instance, at time $t_1$, the controller 26 may anticipate the shared MV 58 to have a value of 110 degrees, whereas the controller 28 may anticipate the shared MV 58 to have a value of 100 degrees.

As discussed above, to effectively "prioritize" control of the shared MV 58, one controller is assigned dominant control with regard to the shared MV 58. In accordance with one embodiment, the dominant and subordinate controllers with regard to the shared MV 58 may be designated by assigning to each of the controllers 26 and 28 one or more tuning coefficients associated with the shared MV 58. For instance, the dominant controller may be tuned to place less emphasis on the desired value of the shared MV 58 received from the subordinate controller, whereas the subordinate controller may be tuned to place a high degree of emphasis on the desired value of the shared MV 58 received from the dominant controller. As will be appreciated by those skilled art, the setting and selection of appropriate tuning coefficients may be depend on the type of process being controlled, as well as the specific control objectives for each controller. Moreover, such coefficients may be set to higher or lower values depending upon whether the objective function implemented by the controllers considers the particular MV or values derived based upon it a cost (to be minimized) or an objective (to be maximized). By way of example, Table 1 below illustrates one possible assignment of tuning coefficients in which the controller 26 is tuned to have subordinate control and the controller 28 is tuned to have dominant control over the shared MV 58:

TABLE 1

| | Tuning Coefficient for Shared MV |
|---|---|
| Controller 26 (Subordinate) | 500 |
| Controller 28 (Dominant) | 1 |

Based on the tuning configuration set forth in Table 1, the dominant controller 28 having a tuning coefficient of 1 may place relatively little emphasis on the desired trajectory 60 for the shared MV 58 provided by the subordinate controller 26. Essentially, the controller 28 is only minimally bound by the constraints imposed on the controller 26. On the other hand, the subordinate controller 26 having a substantially larger tuning coefficient of 500 is tightly bound by the constraints imposed on the controller 28 and, therefore, must place a high amount of emphasis on the desired trajectory 62 provided by the dominant controller 28 for the shared MV 58. In certain embodiments, the tuning coefficients relating to the shared MV 58 may constitute factors in the objective functions for each controller 26 and 28. Thus, by assigning a high tuning coefficient of 500 with regard to the desired trajectory 62 (e.g., from the dominant controller 28), the subordinate controller 26 interprets the dominant controller's desired trajectory 62 as being an important or significant component of the objective function, even if the dominant controller's desired trajectory 62 differs from the subordinate controller's desired trajectory 60. Conversely, by assigning a relatively low tuning coefficient of 1 with regard to the desired trajectory 60 (e.g., from the subordinate controller 26), the dominant controller 28 interprets the subordinate controller's desired trajectory 60 as having minimal impact in achieving its objective function. That is, not complying with the subordinate controller's request will not result in a significant deviation from the dominant controller's control objective.

As will be appreciated by those skilled in the art, the magnitudes of the above tuning coefficients may be reversed if control is defined in terms of a cost function. By way of example, where cost functions (as opposed to objective functions to be maximized) are utilized, the subordinate controller 26 may be tuned with a relatively small coefficient with regard to the dominant controller's desired trajectory 62, thus indicating that the cost of controlling the process based on the desired trajectory 62 is small and thus favored. Further, to ensure the dominance of one controller over the other, only the dominant controller 28 is permitted to write a set point for the shared MV 58. For instance, as shown in FIG. 6A, the controller 28 may write a set point 66 for the shared MV 58 to a distributed control system 68, which may include actuators 28, such as valves, motors, position devices, pumps, and so forth that may adjust the shared MV 58 towards the set point 66.

Figure 6B:
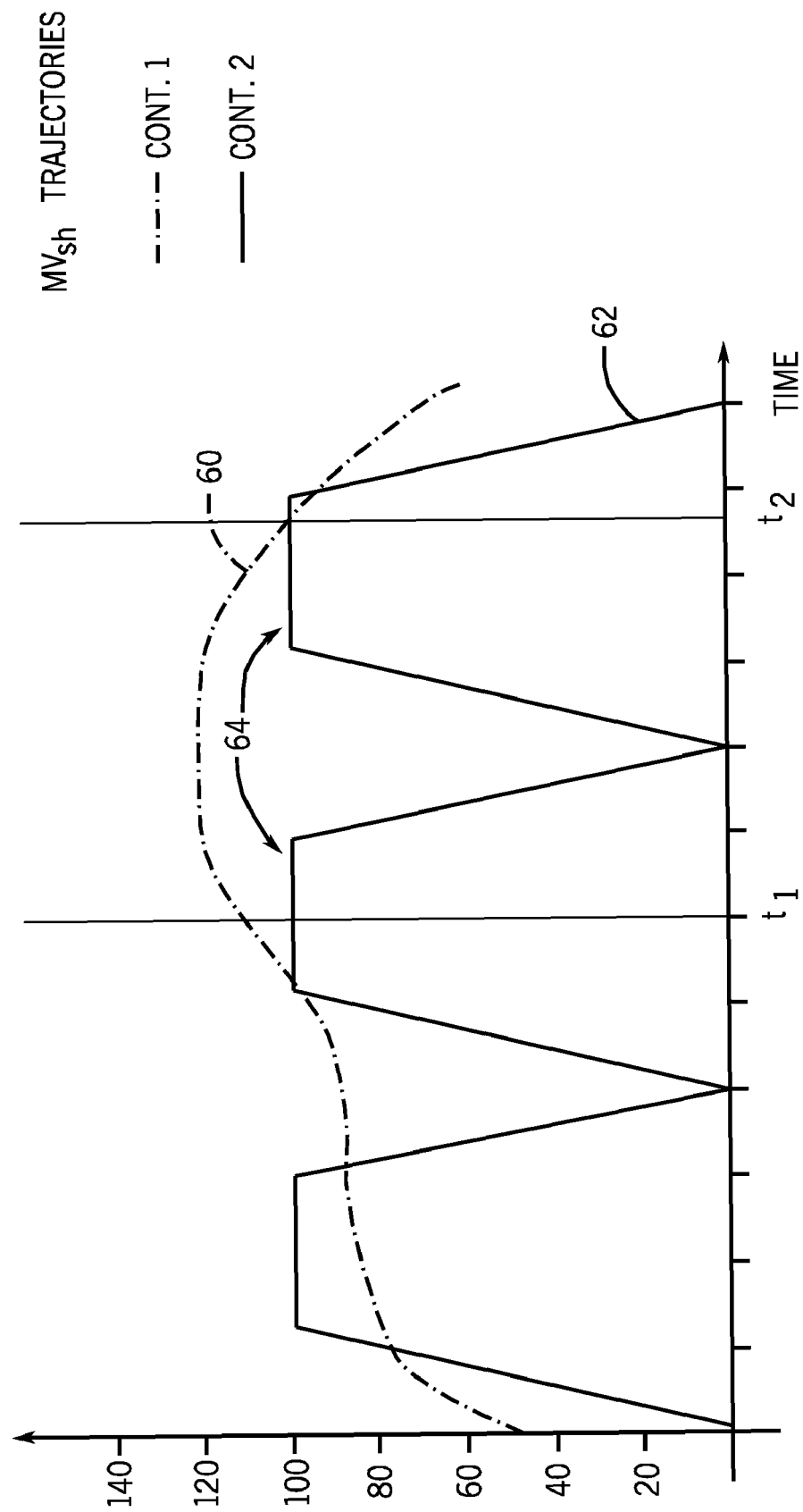
FIG. 6B depicts graphical representations of the desired trajectories determined by each of the two controllers of FIG. 6A for the shared process variable in accordance with an aspect of the present technique.

Applying the foregoing example to the trajectory curves 60 and 62 illustrated in FIG. 6B, at time $t_1$, the dominant controller 28 will read the subordinate controller's desired value for the shared MV 58 as 110 degrees, while the subordinate controller 26 will read the dominant controller's desired value for the shared MV 58 as 100 degrees. From the viewpoint of the controller 28, the desired trajectory 60 of the subordinate controller 26 is viewed as a "request," whereas from the viewpoint of the controller 26, the desired trajectory 62 of the dominant controller 28 is viewed as the "available" value for the shared MV 58 (e.g., what the dominant controller 28 is able to provide in view of its constraints). Thus, based on the tuning of the controllers 26 and 28, the controller 28 views the controller's 26 desired MV value (110 degrees) as having relatively little emphasis with regard to its own control objectives. That is, the dominant controller 28 generally prefers to implement control based on its own desired MV value of 100 degrees and, therefore, may implement control actions in order to drive the shared MV 58 towards its own desired MV value of 100 degrees at time $t_1$. Before doing so, however, the dominant controller may be configured to first assess each of its other MV's as well as the constraints associated therewith in order to determine whether it may still achieve its control objective or objectives using the subordinate controller's desired shared MV value. For example, if the dominant controller 28 determines that in adjusting one or more other MV values, it is able to achieve its control objective using the controller's desired shared MV value of 110 degrees instead of its own desired MV value of 100 degrees, then the dominant controller 28 may grant the subordinate controller's request and write the set point 66 for the shared MV 58 as 110 degrees while simultaneously adjusting its other MV's to compensate for the deviation of the shared MV 58 to the subordinate controller's desired value, indicated by the trajectory 60. Accordingly, despite the difference in their desired trajectories 60 and 62 for the shared MV 58, both controllers 26 and 28 may adhere to their overall control objectives thus improving overall process results.

Conversely, if the dominant controller 28 determines that the constraints imposed on its other MV's makes it impossible to achieve its control objective based on the desired value (110 degrees) of the shared MV 58 specified by the subordinate controller 26, then the controller's request is denied, and the dominant controller 28 writes the set point 66 for the shared MV 58 based on its own desired trajectory 60 (100 degrees). The subordinate controller 26 is then effectively forced to implement control to the best of its ability (e.g., by adjusting its MV's) based on the dominant value of the shared MV 58 until the dominant controller 28 is able to grant the subordinate controller's request, such as illustrated at time $t_2$ in FIG. 6B.

It should be further noted that in some embodiments, that the dominant controller 28 may be configured to adjust both the shared MV 58 and its own other MV's in order to reach a compromised value with regard to the shared MV 58. For example, referring again to the trajectories depicted in FIG. 6B, the situation may arise wherein the dominant controller 28 determines that it is unable to satisfy its own control objectives if the subordinate controller's request of 110 degrees is granted (e.g., by deviating 10 degrees from the dominant controller's 28 desired value of 100 degrees). However, it may be further determined that the dominant controller 28 may still be able achieve its control objective by deviating from its own desired trajectory 62 to a lesser degree, such as 7 degrees for example. Thus, the dominant controller 28 may grant the subordinate controller 26 the shared MV value of 107 degrees, a setting at which the dominant controller 28 may still achieve its own control objectives. Further, although the provided value for the shared MV 58 may not necessarily be on target with the subordinate controller's 26 desired shared MV 58 value, the provided compromised value may nonetheless allow the subordinate controller 26 increased flexibility in achieving its own control objectives. For instance, by using a value of 107 degrees for the shared MV 58, the subordinate controller 26 may not required to adjust its other MV's as drastically as may have been required by using a shared MV 58 value equivalent to the dominant controller's 28 desired trajectory value of 100 degrees.

Thus, the shared MV 58 value may by neither the value desired by the subordinate 26 or the dominant controller 28, but may instead by a "hybrid" value between the two desired values. As described above, the shared MV 58 value ultimately provided to the subordinate controller 26 is limited and conditioned upon the dominant controller 28 being able to achieve its control objectives. Therefore, even if the resulting shared MV 58 set point deviates from both of the desired trajectories 60 and 62, the dominant controller 28 is still able to achieve its control objectives while minimizing the strain on the subordinate controller 26 to achieve its own respective control objectives, thereby improving overall process results.

Figure 6C:
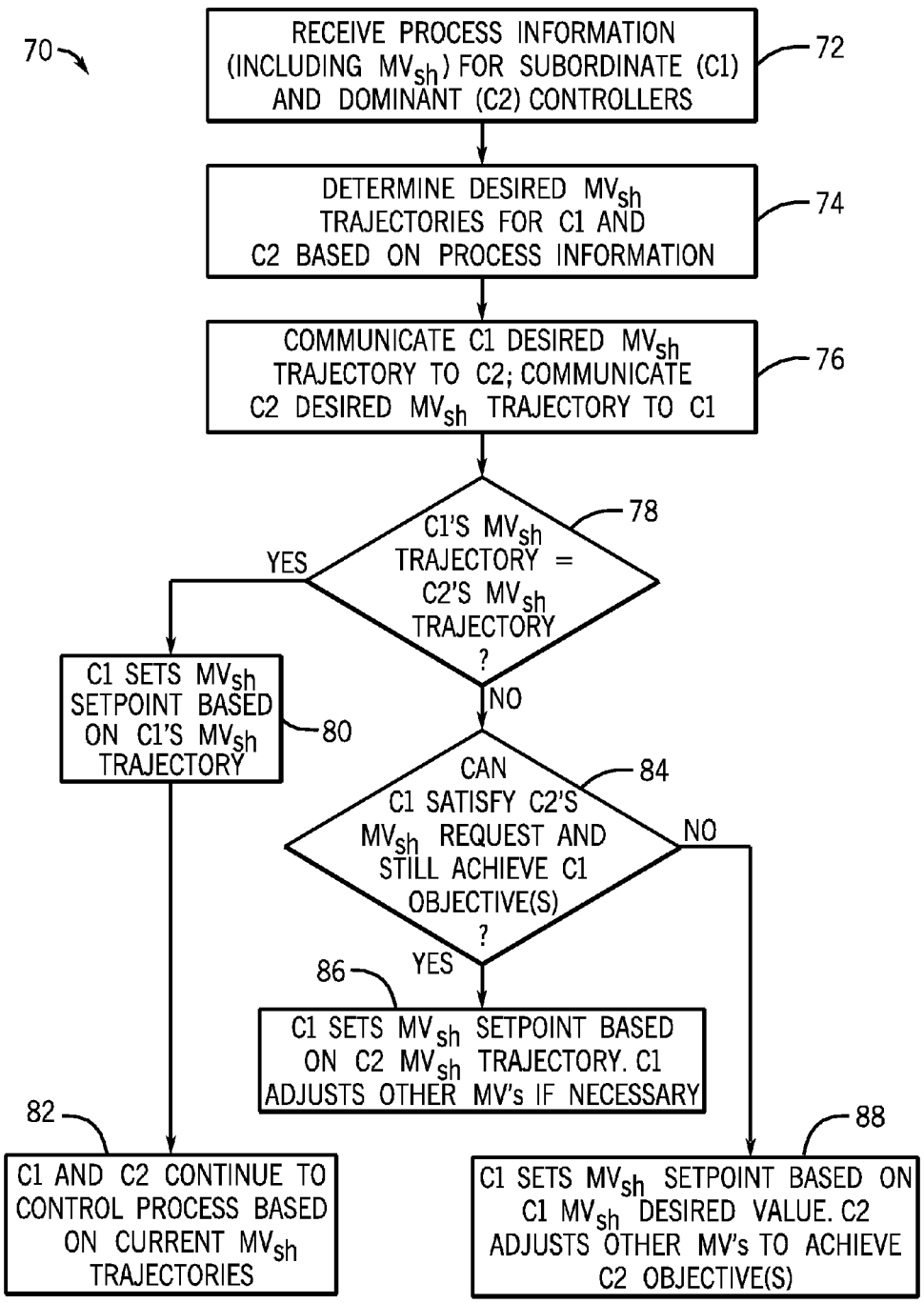
FIG. 6C illustrates exemplary logic for carrying out the present technique for controlling a shared process variable based on the sharing of the desired trajectories, in accordance with the controller configuration illustrated in FIG. 6A.

As shown in FIG. 6C, exemplary logic 70 for implementing control of a shared MV 58 as described with reference to FIGS. 6A and 6B is illustrated. The logic 70 may be implemented by the processing circuitry 36 discussed above with reference to FIG. 3. The logic 70, beginning at step 72, includes first receiving process information corresponding to each of a subordinate and dominant controller, such as the controllers 26 and 28 described above in FIG. 6A. As discussed above, the process information received by each of the controllers may include a current measured value of a shared MV 58. At step 74, each of the controllers, based on respectively received process information (e.g., 18a and 18b), may determine or predict a forward-looking MV trajectory (e.g., trajectories 60 and 62 in FIG. 6B) for the shared MV 58, which is communicated to the other controller, as indicated at step 76. At step 78, if the shared MV trajectories of both controllers indicate an equal or same desired value for the shared MV at the current control time (e.g., time $t_2$ in FIG. 6B), then the dominant controller may set the desired value as the set point for the shared MV, or a controllable output that will influence the MV towards the anticipated or desired trajectory, as indicated at step 80. Thereafter, at step 82, both the dominant and subordinate controller continues to control the process based on the set point for the shared MV.

Returning now to step 78, if the desired values for the shared MV 58 are different between the dominant and subordinate controllers, the logic 70 proceeds to step 84, in which the dominant controller assesses its other MV's and the constraints associated therewith to determine whether it may still achieve its own control objective or objectives using the desired shared MV value requested by the subordinate controller. Thereafter, if the dominant controller determines that it is able to achieve its control objectives based on the subordinate desired value for the shared MV by adjusting its other MV's, then the dominant controller may grant the subordinate controller's request by setting the set point of the shared MV in accordance with the subordinate controller's shared MV desired value, as indicated at step 86.

In some embodiments, such as described above with reference to FIGS. 6A and 6B, the steps 84 and 86 may include the dominant controller determining a compromised or hybrid value for the shared MV which may be equal to neither of the controllers' desired trajectory values, but nevertheless provide the dominant controller with the ability to achieve its control objectives, while providing the subordinate controller flexibility to achieve its own control objectives as closely as possible. However, if the dominant controller determines that any deviation from its desired value will render it unable to achieve its control objectives (e.g., despite the adjustment of other MV's), then the dominant controller denies the subordinate controller's shared MV request and sets the set point of the shared MV in accordance with its own desired value for the shared MV 58, as indicated at step 88.

Figure 7A:
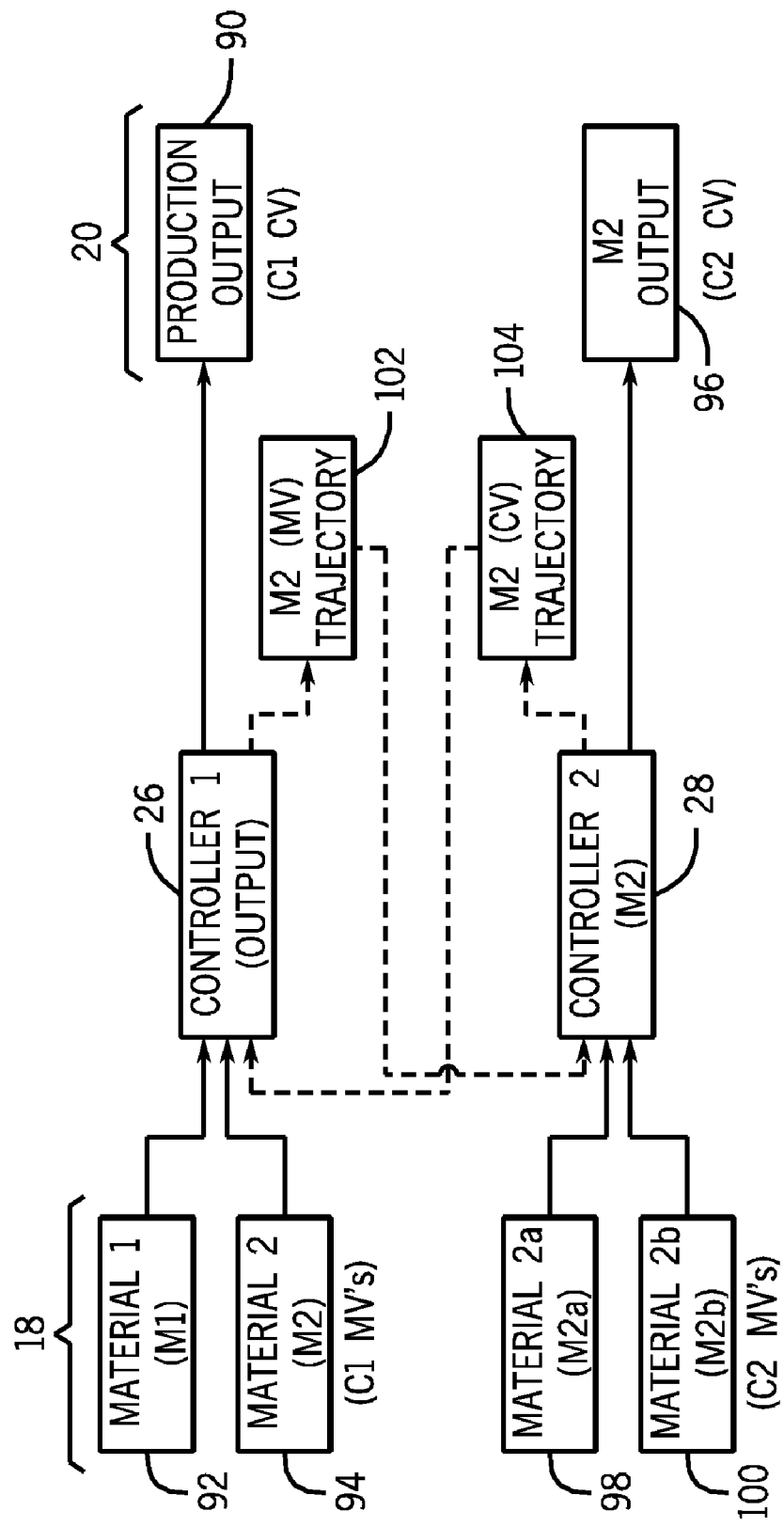
FIG. 7A is a diagrammatical representation illustrating an alternate configuration for the sharing of respective variable trajectories for a process variable associated with two controllers in accordance with an aspect of the present technique.

Continuing now to FIG. 7A, an alternate configuration of the controllers 26 and 28 in which certain aspects of the above-described techniques of variable trajectory sharing may be implemented is illustrated. In particular, FIG. 7A illustrates a cascaded arrangement of two controllers 26 and 28. By way of example only, in the presently illustrated arrangement, the controller 26 may be configured to control the production output or feed rate of a particular product, indicated herein by reference numeral 90, which may be produced by combining or mixing raw materials M1 and M2. Thus, as will be understood by those skilled in the art, the production output 90 constitutes a controlled variable (CV) for the controller 26. The feed rate of the raw materials M1 and M2, designated herein by reference numbers 92 and 94, respectively, constitute manipulated variables (MV's) upon which the controller 26 may base control actions to achieve the production output CV 90. Further, as shown in this cascaded arrangement, the controller 28 may be adapted to control the feed rate of the raw material M2 based on the feed rate of raw materials M2a and M2b. Thus, the output rate of M2 may be considered a CV, designated by reference numeral 96, whereas the feed rate of M2a and M2b, designated by reference numerals 98 and 100, respectively, may be considered as MV's of the controller 28. Further, although the controllers 26 and 28 do not share a common MV, the M2 feed rate MV 94 required by the controller 26 is directly affected by the M2 feed rate CV 96 of the controller 28.

In a manner similar to that described above with reference to FIG. 6A, each of the controllers 26 and 28 may also generate forward-looking desired trajectories for its MV's and CV's based at least partially on the received process information and/or the constraints imposed on each controller. For instance, the controller 26 may generate a desired MV trajectory for the feed rate of M2, represented herein by reference numeral 102, based at least partially on the feed rate of M1, as well as any constraints associated with the controller 26. For example, if one of the control objectives for the controller 26 is to ensure that the mixed final product output 90 has a 1-to-1 ratio composition of M1 and M2, then the desired trajectories for both M1 (not shown) and M2 would be identical. Similarly, based on the MV's for the M2a and M2b feed rates, the controller 28 may generate a desired CV trajectory 104 for the M2 output. As shown in FIG. 7A, the MV trajectory 102 for the M2 feed rate is communicated from the controller 26 to the controller 28, and the CV trajectory 104 for the M2 feed rate is communicated from the controller 28 to the controller 26. The MV trajectory 102 for the M2 feed rate is read by the controller 28 as a requested desired CV value for the M2 feed rate. Similarly, the CV trajectory 104 for the M2 feed rate is read by the controller 26 as a requested desired MV value for the M2 feed rate.

Because the controller 28 directly controls the M2 output rate 96 required by the controller 26, the controller 28 may be tuned to have dominant control over the M2 feed rate MV 94 required by the controller 26 in the presently illustrated example, and thus generally prefers to implement control actions favoring its own desired CV trajectory 104 for the M2 feed rate CV 96. However, because the controller 28 has knowledge of what the subordinate controller 26 desires the M2 feed rate 96 to be, the controller 28 may first assess whether or not it is able to provide the M2 feed rate 96 requested by the subordinate controller 26 (e.g., in accordance with the controller's 26 MV trajectory 102 for M2). This, of course, may depend on the control constraints and objectives imposed on the controller 28. In one example, the controller 28 may implement control over various process units for producing the M2a and M2b materials, and its control objective may call for the M2 output rate 96 to be maintained at or above a certain target, such as 80% production capacity for instance. In this situation, producing more than 80% of the capacity for M2 does not deviate from the control objective. Thus, if the MV trajectory 102 indicates that the M2 feed rate 94 requested by the subordinate controller 26 corresponds to an M2 output rate 96 of 90%, and the dominant controller 28 determines it is able to increase the M2 output CV from 80% to 90% without deviating from its control objectives, then it may do so, such as by adjusting its MV's (e.g., increasing the feed rates of M2a 98 and M2b 100). Further, as described above in FIGS. 6A and 6B, the controller 28 may in some situations determine a compromise or hybrid value for the M2 CV 96 which may be between the projected M2 CV trajectory 104 and the desired M2 MV trajectory 102. For instance, if the controller 28 has a control objective of maintaining at least 80% production capacity with regard to M2, but is able to provide a capacity of 85%, then the controller 28 may attempt to drive the production of M2 towards an 85% production rate. Accordingly, this allows the dominant controller 28 to maintain its control objective (e.g., at least 80% production capacity), while at the same time allowing the M1 controller 26 (subordinate) more flexibility to achieve its own control objective.

On the other hand, the situation may arise wherein the M2 output rate 96 of the controller 28 is constrained by its MV's 98 and 100 such that it is unable to increase the M2 feed rate above 80% capacity. For instance, if one or more of the processing units for producing the M2a or M2b materials goes offline, then the M2 controller 28 may be physically constrained in terms of the total amount of M2 it is able to produce based on the available M2a and M2b input rates 98 and 100. By way of example, the loss or temporary down time of a processing unit for M2a may reduce the M2a input rate 98, which may be reflected in the CV trajectory 104 for the M2 feed rate as a decrease in the production capacity target, from 80% to 70% M2 production capacity. Based on the reduction in the CV for the M2 material feed rate 96, the subordinate controller 26 may or may not take remedial action, depending on its defined control objectives. For instance, if the subordinate controller's 26 control objectives call for a higher emphasis on the quality of the resulting product, then the subordinate controller 26 may reduce the feed rate of the M1 MV 92, such that the ratio of the M1 and M2 materials comprising the product remains consistent in view of the reduced production rate of M2, as indicated by the M2 CV trajectory 104, thus maintaining overall quality of the product.

Alternatively, if the subordinate controller's 26 control objectives place greater weight on total production output 90 over product quality, the controller 26 may continuing implementing control based on the reduced M2 feed rate 94, while maintaining the M1 feed rate 92. Thus, while the quality of the product (ratio of M1 to M2 materials) may deviate, the higher emphasis on the production output objective is satisfied. This foregoing example may be commonly implemented in process systems in which the controller 28 (dominant controller) controls a batch-process having a relatively short batch processing time, and in which the controller 26 controls either a batch-process having a substantially longer batch processing time or a continuous process. That is, due to the short processing time constraints, more emphasis may be placed on the constraints governing the shorter batch-process (e.g., controller 28). Therefore, even though the control of certain process variables in the shorter batch-process may cause an output or a controlled parameter to temporarily deviate from a control objective associated with the longer-batch process or continuous process (e.g., controller 26), there is a longer overall processing time in which such deviations may be compensated for at a later point in the process.

Figure 7B:
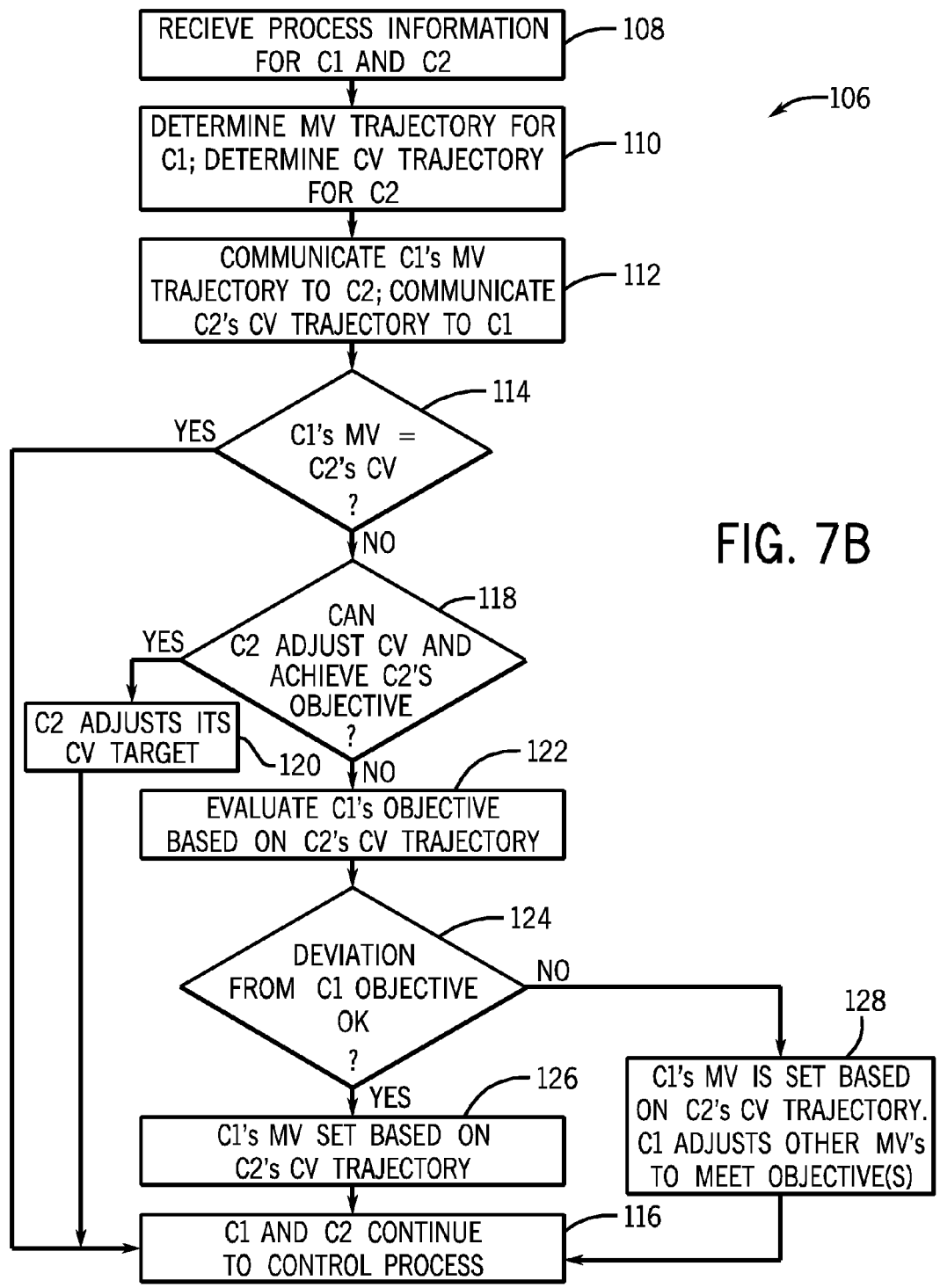
FIG. 7B illustrates exemplary logic for carrying out the present technique for controlling a shared process variable based on the sharing of the desired trajectories, in accordance with the controller configuration illustrated in FIG. 7A.

FIG. 7B illustrates exemplary logic 106 for carrying out the variable trajectory sharing technique based on the cascaded controller configuration described in FIG. 7A. Here again, the logic 106 may be implemented by the processing circuitry 36 discussed above with reference to FIG. 3. The logic 106, beginning at step 108, includes first receiving process information corresponding to each of a subordinate and dominant controller, such as the controllers 26 and 28 described above in FIG. 7A, where the dominant controller controls a variable that is used by the subordinate controller as an MV by which the subordinate controller's control outputs are at least partially based. As discussed above and shown in step 110, the controller 26 may determine a forward-looking MV trajectory 102 for the M2 feed rate based on measured values of the M1 and M2 feed rates, whereas the controller 28 may determine a forward-looking CV trajectory 104 for the M2 feed rate based on the measured values of M2*a* and M2*b*. These trajectories 102 and 104 determined by each of the controllers 26 and 28 are then communicated to the other controller, as indicated at step 112.

Thereafter, at step 114, the projected CV value for M2 indicated by the CV trajectory 104 and the desired CV value for M2 indicated by MV trajectory 102 are evaluated against one another. If the CV and MV value is equal, then the controllers 26 and 28 continue to control the process based on those values as shown in step 116. If the desired MV value differs from the projected CV value, then the dominant controller 28 determines whether or not it is able to adjust the CV while maintaining control objectives in order to satisfy the desired CV value (e.g., based on MV trajectory 102) requested by the subordinate controller 26, as indicated at decision step 118. If the dominant controller 28 is able to do so, then the CV (e.g., M2 feed rate) may be adjusted in accordance with the desired CV value at step 120. Thus, returning to step 116, both controllers 26 and 28 are will continue to control the process based on the desired CV value for the M2 feed rate, as defined by the trajectory 102. Returning to step 118, if the dominant controller 28 determines that it is unable to satisfy the desired CV trajectory 102, then those constraints imposed on the dominant controller 28 are reflected in the subordinate controller 26 as well. Therefore, the subordinate controller must either accept the values set forth in the CV trajectory 104 as its desired MV, or accept a hybrid value for the M2 MV if the dominant controller indicates that a hybrid value is available. For instance, as described above, if the controller 28 may increase or decrease its CV target while still maintaining control objectives, then it may do so. This allows the dominant control to satisfy its control constraints while relaxing the constraints being passed to the subordinate controller with regard to the M2 feed rate variable. Thus, the subordinate controller may attempt to achieve its control objectives and its own CV's based on the M2 feed rate CV ultimately determined by the dominant controller. By way of the above-described examples, control actions implemented by the subordinate controller 26 may depend on whether its control objective function or functions emphasize product quality over product quantity (output), or vice versa.

For instance, at step 122, the subordinate controller's control objectives are evaluated in view of the M2 feed rate defined by the CV trajectory 104. If a deviation from a control objective such as product quality is permitted, as determined at step 124, then the subordinate controller proceeds to control the process based on the desired MV defined by the CV trajectory 104 without adjusting other MV's to compensate for changes in product quality, as shown in steps 126 and 116. Alternatively, if at step 124, it is determined that a deviation from a control objective in the subordinate controller is not acceptable, then the subordinate controller may adjust other MV's in order to achieve the control objective, as indicated at step 128. By way of the example provided above, if a deviation from product quality is deemed to be unacceptable, then the controller 26 may adjust the M1 feed rate to compensate for a reduction on the M2 feed rate in order to maintain the requisite ratio of the M1 and M2 materials in the resulting product. Thus, returning to step 116, the controllers 26 and 28 continue to control the process based on both the desired MV defined by the CV trajectory 104, as well as other MV's that may have been adjusted by the subordinate controller 26 to compensate for a change in the desired value of its M2 feed rate MV. Here again, as one skilled in the art will recognize, the above steps 122-128 may be equally applicable to where the CV output of the M2 feed rate is not equal to the projected trajectory 104, but is instead a hybrid value between the trajectories 102 and 104.

Although the above described techniques have been discussed in the context of variable trajectory sharing between two controllers, it should be understood that these above-described techniques may be applicable to scenarios involving more than two controllers and may be implemented in any type of conceivable process system which may benefit from the sharing of variable trajectories to improve overall process control. To provide an example, the variable trajectory sharing techniques may be applied in the context of a bio-fuel production process, as generally illustrated by FIG. 8.

Figure 8:
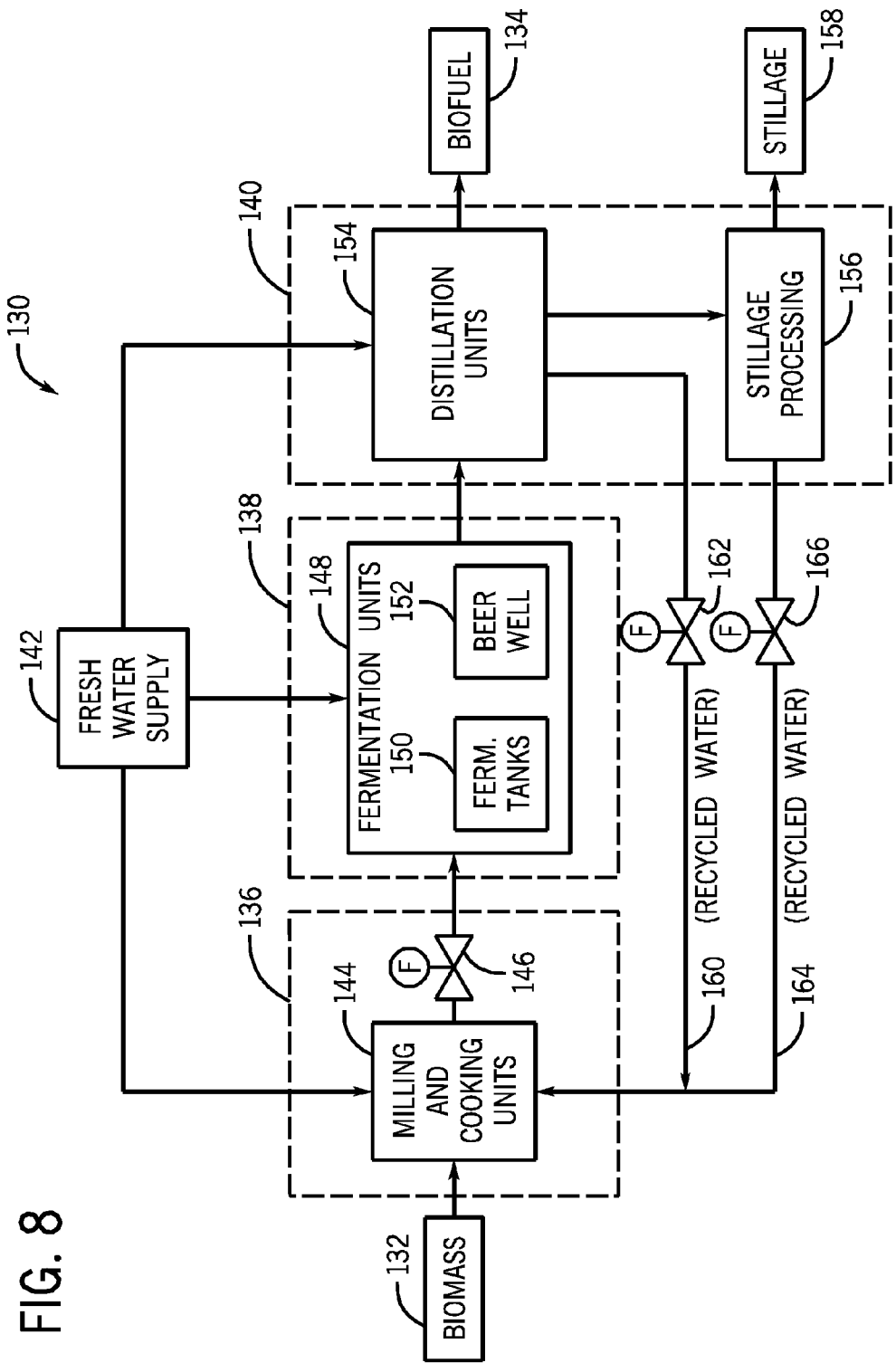
FIG. 8 is a diagrammatical representation of a bio-fuel processing plant in which certain aspects of the present technique may be implemented.

As shown in FIG. 8, an exemplary high-level design of a bio-fuel production plant or process is illustrated and generally referred to by reference numeral 130. The process 130 depicts how a biomass 132, such as corn, sugarcane, or grain, for example, is processed through several stages to produce a biofuel product 134 and one or more co-products. As illustrated herein, the various stages may include a milling and cooking stage 136, a fermentation stage 138, and a distillation and stillage processing stage 140, which may be commonly referred to as a "back-end" stage. The process 130 further includes a fresh water supply source 142 that may supply fresh water to each of the aforesaid processing stages.

The milling and cooking stage 136 may include a plurality of milling and cooking units 144. During the milling and cooking process 136, the biomass 132 is broken down to increase the surface area to volume ratio. This increase in surface area allows for sufficient interaction of the fresh water (e.g., provided by the fresh water source 142) and biomass 132 surface area to achieve a solution of fermentable sugars in water. The resulting mixture from the milling process is essentially a biomass/water slurry which may then be cooked to promote an increase in the amount of biomass and water contact in the solution and to increase the separation of carbohydrate biomass from the non-carbohydrate biomass. The output of the milling and cooking units (i.e., the fermentation feed or slurry) 144 is then sent to a fermentation process 138. The rate at which the slurry is output to the fermentation process 138 may be regulated by a flow controller 146.

In the fermentation process 138, one or more fermentation units 148 operate to ferment the biomass/water slurry produced by the milling and cooking process 136. The fermentation process 138 may or may not require addition of additional fresh water to the process 130 to control the consistency of material to the fermentation units 148, which may include one or more fermentation tanks 150 and beer wells 152. In the fermentation tanks 148, biomass slurry from the milling and cooking process 136 is converted by yeast and enzymes into a biofuel 134 and other by-products, such as carbon-dioxide, water and non-fermentable components of the biomass 132 (solids). The resulting product of each fermentation batch may be subsequently sent to a beer well 152 for temporary storage prior to being processed by the back-end stage 140.

The output from the fermentation process 138 is sent to a distillation process 154, which may include one or more distillation units. During distillation, the biofuel product 134 is separated from the water, carbon dioxide, and non-fermentable solid by-products from the fermentation process 138. As will be understood by those skilled in the art, if the biofuel 134 has to be dehydrated to moisture levels less than 5% by volume, the biofuel 134 may be processed through a processing unit called a molecular sieve (not shown). The finalized biofuel 134 is then processed to ensure it is denatured and not used for human consumption. As the distillation units 154 separate the biofuel 134 from water, fresh water may be added in the form of steam for heat and separation. The condensed water may then be recycled back to the milling and cooking units 144, as illustrated by reference numeral 160. The flow of the recycled water 160 may be regulated by a flow controller 162.

Subsequent to the distillation process, stillage (non-fermentable solids and yeast residue) 158, the heaviest output of the distillation units 154, may sent to stillage processing units 156 for further development of co-products from the biofuel production process. The stillage processing units 156 may be configured to separate additional water from the non-fermentable solids and recycle this water back to the milling and cooking units 144, as illustrated by reference numeral 164. The flow of the recycle water 164 may be regulated by a flow controller 166. Collectively, the flow of both the recycled water 160 and 164 may be referred to as a "back-set flow."

Figure 9:
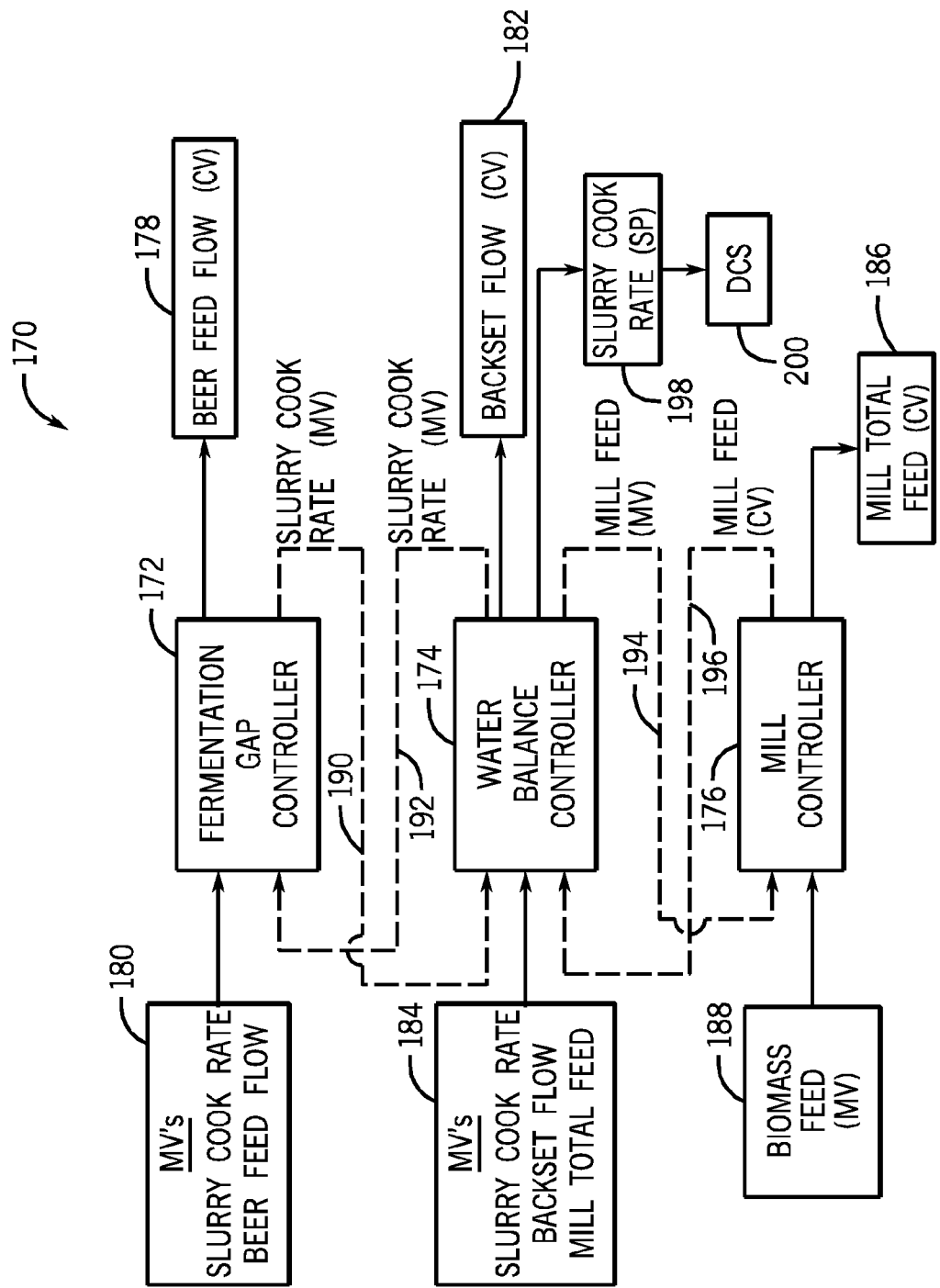
FIG. 9 is a diagrammatical representation of a control system adapted to control various components of the bio-fuel processing plant of FIG. 8 in accordance with an embodiment of the present invention.

With the foregoing overview in mind, FIG. 9 illustrates an exemplary control system 170 which may be implemented to control various aspects of the bio-fuel production process 130 illustrated in FIG. 8 using the variable trajectory sharing techniques described above. The illustrated control system 170 includes a fermentation gap controller 172, a water balance controller 174, and a mill controller 176. As one skilled in the art will appreciate, the fermentation gap controller 172 may be configured to control the total inventory in volume in the fermentation 148 and distillation units 154 in order to assure that filling and back-end processing are maintained at consistent processing rate, the water balance controller 174 may configured to control the backset flow (e.g., recycled water 160 and 162), and the mill controller 176 may be configured to control the feed rate of the milled biomass. The fermentation gap controller 172 controls the process by driving the beer feed flow CV 178 based on the current beer feed flow rate and the slurry cook rate (MV's) collectively represented herein by reference numeral 180. The water balance controller 174 controls the backset flow CV 182 based on current values of the following variables (MV's): slurry cook rate, backset flow, and mill total feed (collectively referred to via the reference numeral 184). Finally, the mill controller 176 controls the mill total feed CV 186 based upon the feed rate (MV) 188 of the biomass 132.

The configuration of the controllers 172-176 reflects both the above-discussed shared MV configuration (e.g., FIGS. 6A-6C) as well as the cascading configuration (e.g., FIGS. 7A-7B). In particular, the fermentation gap controller 172 and the water balance controller 174 are illustrated as sharing the slurry cook rate variable as a common MV. Further, the water balance controller 174 and the mill controller 176 are illustrated in a cascaded configuration, in which the water balance controller 174 relies on the mill total feed variable as an MV, while the mill controller 176 controls the mill total feed variable as a CV.

Referring first to the sharing of the slurry cook rate MV, the water balance controller 174 may be regarded as having the dominant control over the slurry cook rate MV. For instance, as shown in FIG. 9, the water balance controller 174 is illustrated as having permission to write the slurry cook rate set point 198 to a distributed control system (DCS) 200. In accordance with the techniques described above with reference to FIGS. 6A-6C, the fermentation gap controller 172 (subordinate) and the water balance controller 174 (dominant) may each develop a forward-looking trajectory 190 and 192 for the slurry cook rate MV based on received process information (e.g., current MV values), control objectives, and constraints associated with each respective controller. The slurry cook rate MV trajectory 190 for the fermentation gap controller 172 is then communicated to the water balance controller 174, while the slurry cook rate MV trajectory 192 for the water balance controller 174 is communicated to the fermentation gap controller 172.

Because the water balance controller 174 is tuned to exercise dominant control with regard to the slurry cook rate MV, the water balance controller 174 first determines whether it may achieve its control objectives if the fermentation gap controller's 172 requested value for the slurry cook rate MV is granted. If so, the water balance controller 174 may grant the requested slurry cook rate MV (e.g., defined by trajectory 190) and write the corresponding slurry cook rate set point value 198 specified by the MV trajectory 190 to the DCS 200. Alternatively, if the water balance controller 174 determines that it is unable to satisfy the fermentation gap controller's 172 desired value for the slurry cook rate MV without sacrificing its own control objectives, then the fermentation gap controller's 172 request is denied and the water balance controller 174 may determines whether or not suitable hybrid value for the slurry cook rate MV is available. If such a value is available, then the water balance controller 174 writes it's the hybrid value for the slurry cook rate as the set point 198 provided to the DCS 200. If no hybrid value is value (e.g., any deviation from trajectory 192 will deviate from the water balance controller's control objectives), then the water balance controller 174 writes its desired value for the slurry cook rate as the set point 198 provided to the DCS 200. Simultaneously, the fermentation gap controller 172 may adjust its other MV's (e.g., beer feed flow) in order to achieve its own control objectives using the water balance controller's 174 desired value for the slurry cook rate MV, as represented by the MV trajectory 192.

Further, referring now to the configuration of the water balance controller 174 and the mill controller 176, it is noted that these controllers are illustrated in a cascaded configuration as described above with reference to FIGS. 7A-7B. That is, the water balance controller 174 relies on the mill total feed variable as an MV, while the mill controller 176 controls the mill total feed variable as a CV. In accordance with the techniques described above with reference to FIGS. 7A-7B, the mill controller 176 may be tuned to have dominant control over the mill total feed variable. The water balance controller 174 may develop a forward-looking MV trajectory 194 for its mill total feed MV which is communicated to the mill controller 176 and read as the desired CV. That is, the MV trajectory 194 represents the trajectory that the water balance controller 174 wants the mill total feed CV 186 to be driven towards. The mill controller 176 also develops a forward-looking CV trajectory 196 for the controlled mill total feed CV which is communicated to the water balance controller 174.

As described above, the mill controller 176, having dominant control of the mill total feed variable, may first evaluate whether or not it has the bandwidth to satisfy the water balance controller's 174 requested desired value for the mill total feed MV, while maintaining its own control objectives with regard to the mill total feed CV 186. If so, the mill controller 176 may permit the mill total feed CV 186 to be driven towards the value specified by the mill total feed MV trajectory 194 provided by the water balance controller 174. However, if the mill controller 176 is unable to satisfy the mill total feed desired value requested by the water balance controller 174, then the mill controller 176 may either provide a hybrid value for the mill feed CV if available in view of the mill controller's 176 constraints, or else force the water balance controller 174 to operate using the mill feed CV trajectory 196 provided by the mill controller 176.

Thereafter, as discussed above, depending on the water balance controller's 174 control objectives, the water balance controller 174 may or may not adjust other MV's. For instance, if the water balance controller 174 is implemented as having the objective of maintaining a constant backset flow rate CV 182, then it may continue to control the process 130 without adjusting its other MV's to compensate for a deviation from the desired mill total feed value. While this may keep the backset flow rate constant, the quality of the fermentation feed or slurry may decline (e.g., too much water content and/or not enough milled biomass).

Alternatively, if the water balance controller 174 is implemented as emphasizing slurry quality over backset flow rate 182, then the water balance controller 184 may adjust both the slurry cook rate MV and the backset flow MV in order to compensate for a reduction in the mill total feed MV, thus driving the process to maintaining a certain consistency or quality with regard to the composition of the biomass slurry. Further, the adjustment of the MV's 184, as discussed herein, may have propagating effects on other controllers within the control system 170. For instance, as discussed above, the water balance controller 174 is tuned to be dominant over the fermentation gap controller 172. Therefore, if the water balance controller 174 implements control actions which reduce the shared slurry cook rate MV in response to a change in the mill total feed rate MV, the fermentation gap controller 172, being subordinate to the water balance controller 174, may be required to adjust the beer feed flow MV (e.g., 180) in order to compensate for an adjustment in the shared slurry cook rate MV.

Indeed, the presently described techniques for variable trajectory sharing may be applicable to any number of controllers within a process system. Further, the techniques described herein may be implemented in any suitable manner, including hardware-based circuitry or a computer program having executable code stored on one or more tangible computer-readable media. The techniques described herein may also be implemented using a combination of both hardware and software elements, as will be appreciated by those skilled in the art.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. In a process control system having a plurality of controllers, wherein two or more controllers share a common process variable, a method comprising:
   determining for each of the two or more controllers a respective variable trajectory for a shared variable;
   communicating the determined respective variable trajectories between the two or more controllers; and
   controlling the shared variable based upon the determined respective variable trajectories.

2. The method of claim 1, wherein the two or more controllers include a first controller configured to exercise dominant control with regard to the shared variable and a second controller configured to exercise subordinate control with regard to the shared variable.

3. The method of claim 2, wherein each of the dominant controller and the subordinate controller are each constrained by a set of respective control objectives.

4. The method of claim 3, wherein controlling the shared variable based upon the communicated respective variable trajectories comprises determining a set point for the shared variable based on the communicated respective variable trajectories.

5. The method of claim 4, wherein determining the shared variable set point comprises:
   determining if the dominant controller is able to achieve its control objectives using the subordinate controller's shared variable trajectory; and
   designating the subordinate controller's shared variable trajectory as the shared variable set point if the dominant controller is able to achieve its control objectives using the subordinate controller's shared variable trajectory.

6. The method of claim 5, wherein determining the shared variable set point further comprises:
   if the dominant controller is unable to achieve its control objectives using the subordinate controller's shared variable trajectory, determining whether a compromised value for the shared variable is available;
   if a compromised value is available, designating the compromised value as the shared variable set point;
   wherein the compromised value permits the dominant controller to achieve its control objectives, and wherein the compromised value is not equal to a value defined by the subordinate controller's shared variable trajectory or the dominant controller's shared variable trajectory.

7. The method of claim 6, wherein determining the shared variable set point further comprises designating the dominant controller's subordinate controller's shared variable trajectory as the shared variable set point if a compromised value is not available.

8. The method of claim 7 further comprising writing the determined shared variable set point to one or more distributed control systems.

9. The method of claim 8, wherein only the dominant controller is configured to write the determined shared variable set point to the one or more distributed control systems.

10. The method of claim 6, wherein the compromised value is between the shared variable values defined by the subordinate controller's shared variable trajectory and the dominant controller's shared variable trajectory.

11. The method of claim 1, wherein the shared variable is a manipulated variable for each of the two or more controllers.

12. The method of claim 1, wherein the shared variable is a manipulated variable for a first of the two or more controllers, and a controlled variable for a second of the two or more controllers.

13. In a process control system having a plurality of controllers, wherein two or more controllers share a common process variable, a method comprising:
   determining for each of the two or more controllers a variable trajectory for a shared variable;
   communicating the determined variable trajectories between the two or more controllers;
   prioritizing the variable trajectories; and
   controlling the shared variable based upon the prioritized variable trajectories.

14. The method of claim 13, wherein prioritizing the variable trajectories is based at least partially upon a tuning coefficient associated with each of the two or more controllers.

15. The method of claim 14, wherein the tuning coefficients provide for dominant control of the shared variable in a first controller, and provide for subordinate control of the shared variable in a second controller.

16. The method of claim 15, wherein the dominant controller reads a subordinate controller's variable trajectory as its desired value for the shared variable, and wherein the subordinate controller reads a dominant controller's variable trajectory as its desired value for the shared variable.

17. The method of claim 16, wherein the tuning coefficients for the subordinate and dominant controllers represent a degree of emphasis with regard to the desired value for the shared variable in each of the subordinate and dominant controllers.

18. The method of claim 17, wherein the dominant controller and subordinate controller implement control functions based on respective objective functions, and wherein the tuning coefficient for the dominant controller is smaller than the tuning coefficient for the subordinate controller.

19. The method of claim 17, wherein the dominant controller and subordinate controller implement control functions based on respective cost functions, and wherein the tuning coefficient for the dominant controller is larger than the tuning coefficient for the subordinate controller.

20. A process control system comprising:
   a plurality of processing units configured to collectively carry out a process;
   one or more sensors configured to sense one or more process variables;
   a plurality of controllers, each of the controllers being configured to control one or more of the plurality of processing units, wherein each of the controllers comprises:
      input interface circuitry configured to receive variables sensed by the one or more sensors;
      memory circuitry configured to store one or more control algorithms;
      communication circuitry configured to communicate data between the plurality of controllers;
      processing circuitry coupled to the memory circuitry and configured to execute the one or more control algorithms to determine control functions; and
      output interface circuitry configured to output signals configured to drive one or more actuators based on the control functions determined by the processing circuitry;
   wherein two or more controllers are configured to control one or more of the plurality of processing units based at least partially on a shared process variable, and wherein each of the two or more controllers sharing the shared process variable is further configured to determine for each of the two or more controllers a respective variable trajectory for the shared process variable, communicate the determined respective variable trajectories to the other controllers of the two or more controllers using the communication circuitry, and control the shared process variable based upon communicated respective variable trajectories.

21. The process control system of claim 20, wherein the two or more controllers sharing the variable include a first controller configured to exercise dominant control with regard to the shared process variable, and a second controller configured to exercise subordinate control with regard to the shared process variable.

22. The process control system of claim 21, wherein a dominant controller is configured to read a subordinate controller's variable trajectory as its desired value for the shared process variable, and wherein the subordinate controller is configured to read the dominant controller's variable trajectory as its desired value for the shared process variable.

23. The process control system of claim 22, wherein configuring the first controller to be dominant includes assigning a first tuning coefficient to the first controller, the first tuning coefficient being configured to deemphasize the subordinate controller's variable trajectory, and wherein configuring the second controller to be subordinate includes assigning a second tuning coefficient to the second controller, the second tuning coefficient being configured to emphasize the dominant controller's variable trajectory.

24. The process control system of claim 21, further comprising a distributed control device configured to drive the shared process variable towards a set point.

25. The process control system of claim 24, wherein only the dominant controller is configured to write the set point to the distributed control device.

26. A non-transitory computer-readable medium storing instructions executable by a processor-based device in a process control system having multiple controllers, the multiple controllers including two or more controllers configured to share a common process variable, the instructions comprising:
   a routine configured to determine a respective trajectory for a shared variable for each of the two or more controllers;
   a routine configured to communicate the determined respective trajectories between the two or more controllers;
   a routine configured to control the shared variable based upon the communicated respective trajectories.

* * * * *